Aug. 4, 1936.  F. A. BENFORD  2,050,035
REFLECTOR AND METHOD OF DESIGNING SAME
Filed Dec. 20, 1934   3 Sheets-Sheet 1

Inventor:
Frank A. Benford,
by Harry E. Dunham
His Attorney.

Aug. 4, 1936.   F. A. BENFORD   2,050,035
REFLECTOR AND METHOD OF DESIGNING SAME
Filed Dec. 20, 1934   3 Sheets-Sheet 2

Inventor:
Frank A. Benford,
by Harry E. Dunham
His Attorney.

Aug. 4, 1936.   F. A. BENFORD   2,050,035
REFLECTOR AND METHOD OF DESIGNING SAME
Filed Dec. 20, 1934   3 Sheets-Sheet 3
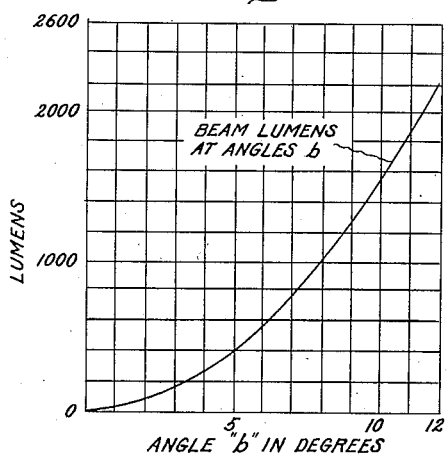
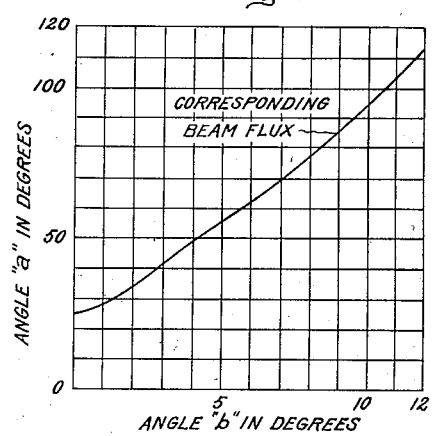
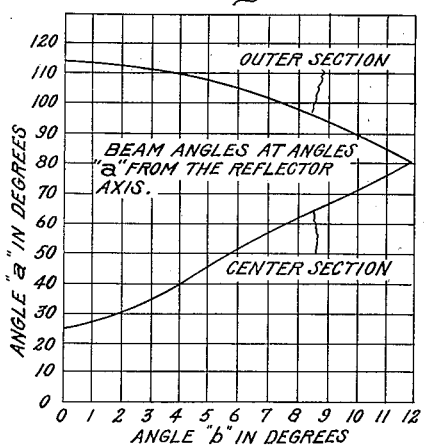
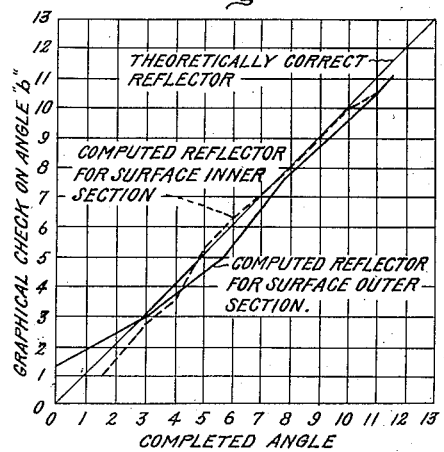
Inventor:
Frank A. Benford,
by Harry E. Dunham
His Attorney.

Patented Aug. 4, 1936

2,050,035

UNITED STATES PATENT OFFICE 2,050,035

REFLECTOR AND METHOD OF DESIGNING SAME

Frank A. Benford, Schenectady, N. Y., assignor to General Electric Company, a corporation of New York Application December 20, 1934, Serial No. 758,389

1 Claim. (Cl. 240—41.35)

My invention relates to reflectors and a method for designing them, and more particularly to reflectors designed to give a desired beam formation from a light source, whose light distribution is predetermined.

One object of my invention is to provide a general method for determining the curvature of reflector surfaces necessary to give a desired beam formation from a light source having a predetermined light distribution.

Another object of my invention is to provide a reflector for projectors which will project a beam of uniform intensity from a non-uniform intensity light source.

Another object of my invention is to provide an improved reflector for projecting overlapping beams for neutralizing optical defects in each beam.

For a better understanding of my invention, together with other and further objects thereof, reference is had to the following description, taken in connection with the accompanying drawings, and its scope will be pointed out in the appended claim.

In the accompanying drawings, Figs. 1 to 4 indicate diagrammatically the method of designing a reflector and Figs. 5 to 10 indicate graphically the calculated values required for obtaining the measurements necessary for making a desired reflector.

Figure 1:
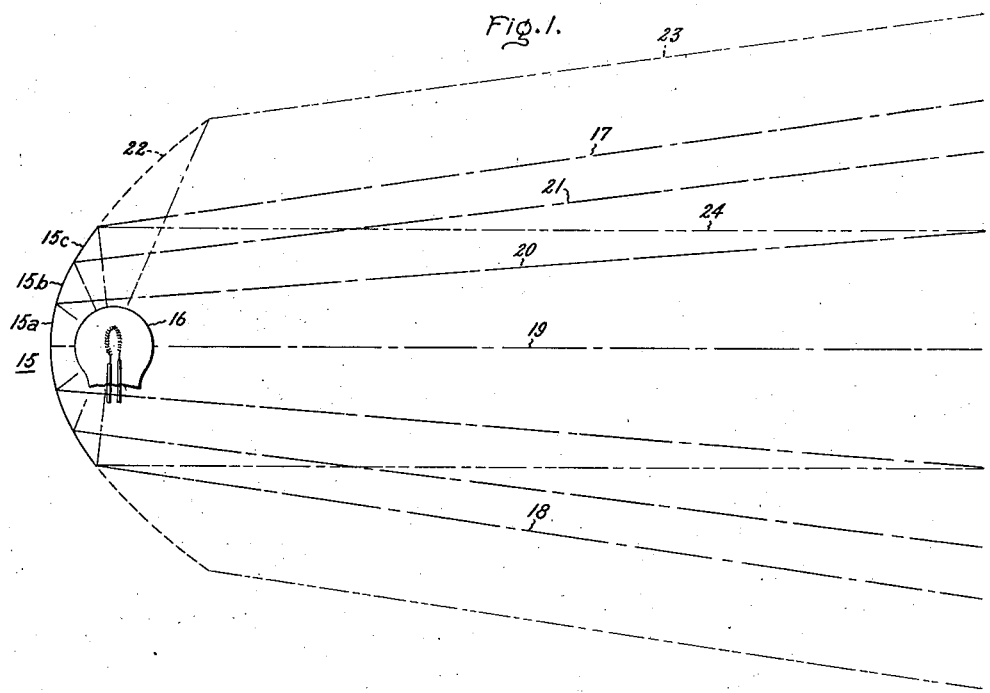

Referring to the figures in detail, Fig. 1 indicates a reflector 15 receiving light from a source 16 and projecting a beam bounded by the lines 17 and 18. To illustrate my invention, a meridian cross section of the reflector 15 is indicated diagrammatically, being divided into elements, 15a, 15b, and 15c. In this illustration only three elements are noted. The actual number of elements may be altered at will and the greater the number the more accurate the surface will be. The source of light 16 is indicated as the filament of an incandescent lamp comprising a coil of wire supported in the shape of an open circle. The light projected from this filament is more intense when the filament is viewed normal to the plane of the filament than it is when viewed from its edge. The reflector surface elements 15a, 15b and 15c, upon which this light impinges, are shaped so as to distribute, in the present case, the light evenly in the beam area. The reflector elements 15a, 15b, and 15c are in the present case annular rings or zones, it being assumed that the light about the axis 19 is symmetrical. The light reflected by the element 15a is bounded by the axis 19 and line 20, the light reflected by the element 15b is bounded by lines 20 and 21, and the light reflected by the element 15c is bounded by lines 21 and 17. It will be apparent that the spread of the rays, or width of the beam, reflected by element 15c, which receives the light from the edge of the filament, is smaller than that reflected by the element 15a, which receives the light almost normal to the plane of the filament. The difference in the beam formation of the elements is calculated in the present case to produce a uniform intense beam, but it must be understood that the method can be used to obtain any desired beam formation.

In order to improve the beam still further, I divide a complete reflector into sections, each of which gives substantially the same beam shape. Referring to Fig. 1, I have illustrated by dotted lines a second reflector section 22 which reflects a beam bounded by lines 23 and 24 which are respectively parallel to line 17 and axis 19. It is, of course, evident that the beams from the two sections do not completely overlap at the axis of the reflector. For all practical purposes, however, they do overlap since the reflector is very small with respect to the width of the beam and the slight off-set at the reflector axis is not noticeable a short distance away from the projector. In the illustration and in the following calculations, a symmetrical distribution of light about a horizontal axis 19 is assumed. The reflector obtained is, therefore, a surface of revolution and the elements 15a, 15b, and 15c are rings or zones. It will be understood, however, that this same process can be applied to non-symmetrical reflectors by simply applying the same method of procedure to other sections taken at various angles to the first cross-section.

Figure 2:
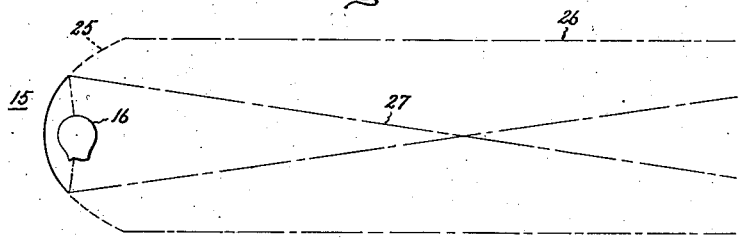

Fig. 2 indicates a modification of the section 22 shown in Fig. 1. In this figure the outer section 25 is designed to project a beam in such a manner that the outside edge of the reflector projects the edge of the beam parallel to the axis, as indicated by the line 26, and the inner edge of the section projects the edge of the beam parallel to the opposite edge of the beam projected by the portion 15, as indicated by the line 27. The advantage of this type of projection is a reduction in the diameter of the reflector for a given beam width and a possibility of gathering more of the projected light from the source with a given diameter reflector.

The beams projected by the respective sections overlap and, in this modification, are reversed with respect to each other. In other words the adjacent edges of the two sections serve opposite sides of the beam. This reversed overlap minimizes imperfections in the beam caused by minor imperfections in the filament which it is not practical to provide for in the reflector section surfaces. Thus for example a bright spot on the filament is projected by one of the beams into one portion of the total beam and into another portion by the reversed overlapping beam.

In the following calculations, a double beam reflector according to Fig. 1 will be calculated and a uniform intensity beam will be assumed as the desired beam since this is a type of beam that can be widely used.

Theory

As stated above, there are two assumptions made in the following calculations; first, that the light distribution of the source about an axis is symmetrical and that the reflector to be developed will be a surface of revolution. These conditions are the usual conditions for nearly all projecting devices and therefore do not constitute a practical limitation. The process can, however, be applied for calculating reflectors which are non-symmetrical and where the source of light is non-symmetrical about an axis. This will be evident to those skilled in the art since to so apply the process it is only necessary to repeat the process, hereinafter described, for as many reflector sections through an assumed axis as is desired. The cross-sections so calculated would then combine to give the necessary reflector shape without any assumptions whatever being made.

In the art of projecting light, it is elementary that the projected light beam contains the light received from a source minus the losses due to the inability of a surface to reflect all of the received light. Expressing this mathematically, we have:

$$F = KL \text{ lumens} \qquad (1)$$

when F is the light in the beam; K is a constant by which the reflector reduces the light received, and L is the incident light received from the source.

The simplest case that may be encountered includes a source that radiates with equal intensity in all directions, and a reflector for collecting this flux of uniform intensity and projecting it as a beam of uniform intensity throughout its cross section. As an example we may assume a lamp to radiate 1000 candle power in all directions, and a reflector placed back of this lamp so as to receive just half the light. The spherical area of the reflector is $2\pi$, or half a sphere. If a beam strength of 10,000 candles is desired, then the beam must be contracted to cover a solid angle S of one-tenth a hemisphere, and further be reduced by a factor K to compensate for the loss of light on the reflector. The angular relations then become:

$$2\pi(1000) = 0.2\pi K(10,000) \text{ lumens}$$

or the solid angle $$S = 0.2\pi K \text{ steradians}$$

Converting this value into angular beam width we have 48 degrees when K, the coefficient of reflection is 0.85.

The usual case occurs with a light source symmetrical about the axis common to the reflector and source but the intensity of radiation $I_a$ varies with the angle in the plane of the cross section in some orderly manner, and the beam intensity is desired to be uniform. This description is directed to that case.

To obtain the desired beam formation, each element of a reflecting surface is so oriented that the reflected light therefrom serves a specified or predetermined portion of the continuous beam reflected by the reflecting surface. The equation for such reflector, having in mind Equation (1), as above stated, may be written as follows:

$$\int_0^b I_b(1-\cos b)db = K\int_0^a I_a(1-\cos a)da \text{ lumens} \qquad (2)$$

Figure 3:
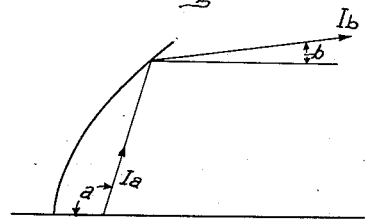

The terms for this equation, illustrated in Fig. 3, are as follows:

$a$ = angle of emitted ray, measured from axis at the focus $I_a$ = intensity, in candles, at angle "$a$" about source $b$ = angle of ray in beam, measured from the axis $I_b$ = intensity, in candles, at angle "$b$" in beam.

Derivative of equation of reflecting surface

Figure 4:
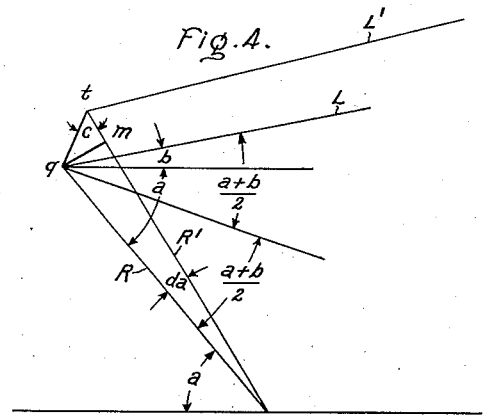

The equation of an optical reflecting surface is most easily stated in the polar form, that is, in terms of the generating angle "$a$" and the radius vector R from the focal point to the surface as illustrated in Fig. 4.

Referring to Fig. 4, the line "$qt$" denotes an element of the surface that reflects a ray L at an angle $(a+b)$ from its original direction. The letters "$a$" and "$b$" in this instance refer to the same angles illustrated in Fig. 3. To do this the reflecting element must be rotated by half the angle $(a+b)$ from the position where its normal coincided with the incident ray. The angle $qtm$ denoted as angle "$c$" is equal to $$90 - \frac{a+b}{2} - da,$$

and the differential $da$ may be dropped, leaving $$\text{angle } c = 90 - \frac{a+b}{2} \qquad (3)$$

Also $$qm = R\,da \qquad (4)$$

$$mt = qm \cot c$$

$$= qm \tan \frac{a+b}{2} \qquad (5)$$

But $mt$ is the increment "$dR$" of R that occurs when the angle "$a$" is increased by an increment $da$, and therefore we can write $$dR = R \tan \frac{a+b}{2} da \qquad (6)$$

or $$\frac{dR}{R} = \tan \frac{a+b}{2} da \qquad (7)$$

and $$\int_1^r \frac{dR}{R} = \int_0^a \left[\tan \frac{a+b}{2} da = \log R\right]_1^r \qquad (8)$$

If $b=0$, the reflected light is parallel to the axis and the integration of the two first terms of Equation (7) leads to the equation of a parabola. But for the general case of Equation (2) angle "$b$" may have any value and the solution is not so simple.

From Equation (7) it is evident that the half angles $$\frac{a}{2} \text{ and } \frac{b}{2}$$

may be used in further equations, and Equation (2) may be rewritten (with unnecessary factors dropped).

$$\int_0^b I_b \sin^2 \frac{b}{2} db = K \int_0^a I_a \sin^2 \frac{a}{2} da \qquad (9)$$

The variables here are $$I_b \sin^2 \frac{b}{2} = K I_a \sin^2 \frac{a}{2} \qquad (10)$$

and therefore $$\sin \frac{b}{2} = \sqrt{\frac{K I_a}{I_b}} \sin \frac{a}{2} \qquad (11)$$

In practice $I_a$ is a function of the angle "$a$" as determined by a photometric distribution test about the lamp, and the intensity $I_b$ (See Fig. 3) may be a function of the angle "$b$", so that it is plain that while angle "$b$" may be expressed in Equation (11) as a function of angle "$a$", any attempt to substitute this value of "$b$" in Equation (8) leads to forms that cannot be easily integrated and recourse must be had to some practical process of graphical or numerical integration.

The factor $$\frac{K I_a}{I_b}$$

is a measure of the strength of the projected beam, and it may be constant with a given reflector, or it may vary with the angle of projection. If the lamp radiates equally in all directions and the beam intensity is uniform throughout, this quantity has a constant value at all angles, but if either $I_a$ or $I_b$ vary with the angle, then this quantity must be computed for each separate angle "$a$" and "$b$".

In the formulae so far used diverging beam rays have been assumed. The rays may also converge towards the axis, if desired, as illustrated in Fig. 2, and in practice it is often of considerable advantage to use convergent rays because this construction gives a generating curve that collects more light for a given diameter of reflector. In the previous equations "$a$"+"$b$" can be replaced by "$a$"−"$b$" to convert from the divergent system into the convergent system.

There is a relationship existing between these generating curves, which we may divide into "$a$"+"$b$" and "$a$"−"$b$" groups, and the conic family. If a light source having uniform intensity in all directions is available, and the reflectors are of coefficient unity, then there are two reflecting surfaces that will give beams of unit strength, that is, the source and image are equal in intensity and the radical in Equation (11) is equal to unity.

One of these surfaces is a plane, which gives a virtual image and the plane itself is the limiting case of the family of hyperboloids, and also the limiting case in Equation (11) when $+b=+a$. If $b$ is zero then the curve becomes a parabola which is the particular member of the conic family that lies at the junction point of the hyperboloids and ellipsoids.

If "$b$" is negative and equal to "$a$" then the curve becomes a circle, which is also a limiting case for the conics and the second surface giving an image (real in this case) equal in intensity to the source. The limiting cases of the $a=b$ curve thus agrees with the limiting cases of the hyperboloid, that is, the plane and paraboloid, and the limiting cases of the $a-b$ curve agrees with the ellipsoid with limiting cases, the paraboloid and circle. The "$a$"+"$b$" curve is thus in the hyperboloidal system and the "$a$"−"$b$" curve is in the ellipsoidal system.

*Application of the equations to the design of a reflector*

To illustrate the method of calculating the curvature of a reflector in accordance with my invention, I will assume the light source as being one of the standard incandescent filament lamps such as 250 w. Mazda, for example, in which the filament is an annular cylinder in form and viewed along the axis has a diameter of nearly 0.5".

The physical dimensions and conditions are to be:

|   | Inches |
|---|---|
| 1. Effective reflector diameter | 15 |
| 2. Central aperture diameter | 2.5 |
| 3. Thickness of the reflector glass | 0.125 |
| 4. Lamp bulb diameter | 5.0 |

Optical conditions:
1. Overlapping beams_____ 2
2. Effective beam width_____degrees__ 30
3. Effective collecting factor, minimum_ 0.70
4. Beam efficiency (at least)_____ 0.50
5. Beam intensity substantially uniform at all points.
6. Beam reasonably free from images.
7. Beam width adjustable through range of 2 to 1 without objectionable defects in beam formation.
8. Assumed width due to filament size degrees__ 6
9. Assumed width due to reflector degrees__ 24

The method of calculating the reflector, having given the above specifications, may be divided into the following steps:

1. Plot curve in rectangular coordinates giving the intensities of bare lamp radiation at all angles.
2. Plot curve in rectangular coordinates, giving the intensities as corrected for outside interference.
3. Compute summation table of corrected bare lamp lumens.
4. Plot lamp angles "$a$" against effective lumens.
5. Compute summation table of beam lumens.
6. Plot beam angles "$b$" against beam lumens.
7. Plot "$a$" against "$b$" at points of equal lumens.
8. Tabulate "$a$" and "$b$" at uniform lumen increments, and make folded scale of "$b$" values for double surfaces.
9. Tabulate "$a$" and "$b$" in degrees according to equal increments in "$a$" expressed in radians and compute $$\frac{a-b}{2}$$

and find $$\tan \frac{a-b}{2}$$

10. Use $$\tan \frac{a-b}{2}$$

in tabulation of Gregory-Newton formula for numerical integration to find $R_a$.

11. Plot $R_a$ and "$a$" to large scale.
12. Measure and plot angles of reflected rays at all computed points on curve.
13. Find scale to reduce reflector to required physical dimensions.
14. Compute $x$ and $y$ coordinates for all values of $R_a$ using the focal point as origin.

1 and 2. Lamp curves

Figure 5:
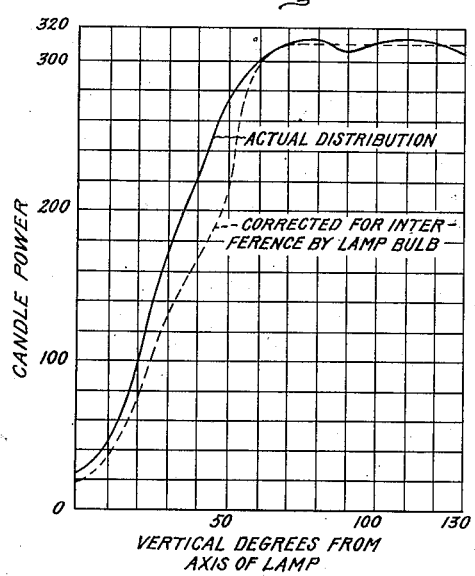

Fig. 5 illustrates graphically the light output of the assumed standard incandescent lamp adaptable for use in floodlights and having a light output substantially similar in general distribution to that obtainable from the average lamp of that type. The total measured output of this lamp is 3400 lumens, but for present purposes only the form of the graph or curve is material. If the reflector were being designed for a fixed intensity beam, the actual values would necessarily have to be used.

A preliminary drawing of the proposed reflector and lamp indicates that light reflected by the reflector within 49 degrees from its base would strike the bulb after reflection. This fact must be taken into consideration since this light is weakened by this second passage through the bulb, by reflection and refraction. The curve of Fig. 5 is therefore changed so as to reduce the values of the light up to 40 degrees by 25%, which is an arbitrary figure arrived at by tests, and gradually allow this curve of corrected values to join the first curve of the measured values to avoid sudden changes in the reflector curvature. This then gives us a corrected source distribution curve to work with.

3. Summation of corrected bare lamp lumens

The corrected radiation values as shown in Fig. 5 are used to compute the effective bare lamp lumens, and in the following tabulation two summations are given. First, a summation from the axis, and then, after a trial design of the reflector had been made, a second summation starting from 25 degrees, since the light within this angle was found to have entered the opening left in the center of the reflector to accommodate the lamp socket. The summation of light up to 115 degrees amounts to 2311 lumens, and since a preliminary estimate of the angular opening of the reflector indicated a collecting angle for the reflector of between 110 degrees and 115 degrees the effective quantity of light was taken as 2240 lumens and all further computations are based on this value.

Following are a few selected computations:

| Outer angle | C P (Fig. 5) | Zone area | Zonal | Σ Zone | Σ Lumens | Σ Lumens |
|---|---|---|---|---|---|---|
| $a$ | $I_a$ | Z | Lumens | 0° | From 0° | From 25° |
| 0 | 19 | 0.024 | 0.5 | 5° | 0.5 | |
| 20 | 76 | 0.375 | 28.5 | 25° | 35.5 | 0 |
| 60 | 300 | 0.948 | 284.4 | 65° | 690.3 | 654.8 |
| 110 | 312 | 1.029 | 321.0 | 115° | 2347.1 | 2311.6 |
| 130 | 312 | 0.839 | 261.7 | 135° | 2004.6 | 2869.1 |

Figure 6:
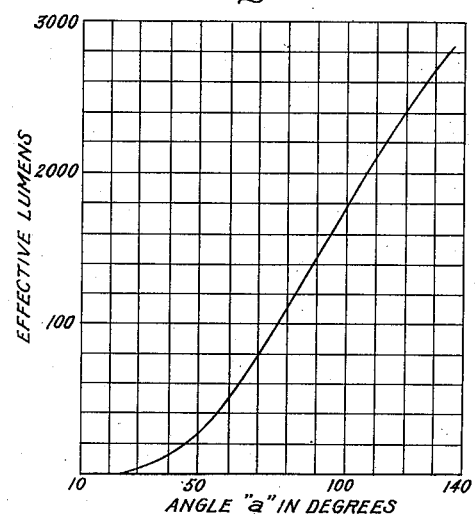

4. Using the values obtained in the above table, a curve illustrated in Fig. 6 is plotted preferably on large sized coordinate paper so that the angle "$a$" can be picked off with an accuracy of about 0.1 degree. The curve is carried well beyond what is believed to be the last useful point, in this case up to 135 degrees.

5. Summation of beam lumens

In the following abbreviated tabulation the fifth column gives the spherical area in steradians corresponding to the beam widths in the fourth column. The area for a beam having a width 12° is 0.13727 and as the available light is 2240 lumens the average beam intensity is 16,220 candles for a 250 watt lamp and twice that for a 500 watt lamp. No allowance is here made for the width added to the beam by the physical dimensions of the light source.

| Angle | Zone | Zonal area | Σ Zone 0° to | Summation Σ Z | Lumens 16320×Σ Z |
|---|---|---|---|---|---|
| "$b$" | | Z | (Beam width) | (Spherical area) | |
| 0°30′ | 0°–1° | 0.00096 | 1° | 0.00096 | 15.67 |
| 5°30′ | 5°–6° | 0.01051 | 6° | 0.03441 | 561.60 |
| 11°30′ | 11°–12° | 0.02185 | 12° | 0.13727 | 2240.20 |

$$I_b = \text{Ave. c. p.} = \frac{2240}{0.13727} = 16320 \text{ beam C P}$$

6. Plot of beam angles (b) against beam lumens

This curve illustrated in Fig. 7 is plotted to a large scale from the preceding tabulation and is used to read the beam angle "$b$" corresponding to a given beam flux. By means of the two curves of Figs. 6 and 7, the values of "$a$" and "$b$" for a given flux can be determined graphically with fair accuracy. It is necessary to use extreme care in this part of the work in order to realize the full attainable accuracy of the process.

7. Plot of angles "a" and "b" at points of equal lumens

From the values obtained in the graphs of Figs. 6 and 7, a curve may be obtained, as already stated, for corresponding angles "$a$" and "$b$" for a given beam flux. Thus for example in Fig. 7 a 5° angle "$b$" corresponds to approximately 400 beam lumens and in Fig. 6 the angle "$a$" at 400 lumens is approximately 55°. This curve is shown in Fig. 8. In making the numerical integration, the best spacing is, for the example given, about 0.1 radian ($r$), and the "$ab$" curve gives a good opportunity to change over from degrees to radians. The integration could be carried out in steps of degrees, but this would entail the use of an awkward multiplier in the tabulation, which might reduce the accuracy.

8. Tabulation of "a" and "b" at uniform lumen increments

The formula for determining the radius vectors of the curve calls for the simultaneous use of related angles $$\frac{a}{2} \text{ and } \frac{b}{2}$$

In the following table corresponding values of "$a$" and "$b$" are taken from the curves of the Figures 7 and 8 at uniform spacings of 100 lumens. Thus, up to 80.3 degrees about the lamp there are 1100 effective lumens, and this quantity of light from the inner section of the mirror will form a beam 8.37 degrees wide each side of the axis, and up to 2200 lumens angle "$a$" being 113.8° the beam width is 11.89 degrees, also measured from the axis. These two angles, 8.37 degrees and 11.89 degrees, appear to indicate a discrepancy in the computed widths of the beams projected by the two sections of the reflector.

The size of the source, however, increases the beam width from the inner section more than it does the beam from the outer section, so that this discrepancy disappears and the effective beam widths at the two points become approximately 15° on either side of the axis, as originally planned.

As stated above, it is proposed to have the complete reflector give two complete and coinciding beams. The first 1100 lumens (half the total available light) at "$a$"=80.3 degrees is to be projected by the section 15 of Fig. 1 and the other 1100 lumens are to be projected by the section 22 of Fig. 1. In this same manner the total light flux may be divided among more than two sections.

It has been found that the light from the 60 degree point on a paraboloid is most sensitive to focal adjustment, that is, light reflected from this region is deflected to the side most rapidly when the source is moved along the axis. It is, therefore, to be expected that the use of the 80 degree region, which is near this point of maximum focal sensitivity to form the edge of the beam will lead to a better control of beam width than if the edge of the beam comes from the edge of the reflector at about 114°.

The following is the tabulation of the corresponding values of "$a$" and "$b$" at uniform lumen increments for the double beams as obtained from curves illustrated in Figs. 7 and 8:

| Summation lumens | "$a$" | Double beam "$b$" |
|---|---|---|
| 100 | 37.5° | 3.58° |
| 500 | 61.3° | 8.01° |
| 1100 | 80.3° | 11.89° |
| 1600 | 95.2° | 8.78° |
| 2200 | 113.8° | 0.00° |

The curve plotted from these tabulations is illustrated in Fig. 9.

9. Tabulation of "a" and "b"

The following tabulation gives values of $$\frac{a-b}{2}$$

and $$\tan \frac{a-b}{2}$$

at "$a$" spacings of 0.1 radian. The divergence is made zero at 2.0 radians and beyond, so that if the surface is used beyond 2 radians the surface will be parabolic and add to the central intensity and thus build up a critical part of the beam.

| Radians $r$ | "$a$" | "$b$" | "$a$"−"$b$" | $\frac{a-b}{2}$ | $\tan \frac{a-b}{2}$ |
|---|---|---|---|---|---|
| 0.5 | 28.65° | 1.59° | 27.06° | 13.58° | 0.24162 |
| 1.0 | 57.30° | 7.43° | 49.87° | 24.94° | 0.46489 |
| 1.5 | 85.94° | 10.47° | 75.47° | 37.74° | 0.77382 |
| 2.0 | 114.59° | 0 | 114.59° | 57.28° | 1.55670 |

10. Summation of $\tan \frac{a-b}{2}$

A numerical summation of the function $$\tan \frac{a-b}{2}$$

is carried out by means of the Gregory-Newton formula which is set forth below. In this formula let "$r$" indicate the step length (in radians) at which the successive values of "$a$" are taken: let the successive values of $$\tan \frac{a-b}{2}$$

be indicated by $t_0$, $t_1$, $t_2$, etc. The first, second, etc. order of the differences can be indicated by $\Delta^1$ $\Delta^2$ $\Delta^3$ where the figures 1, 2, 3, etc. are not to be mistaken for exponents.

$t_0$
  $\Delta^1_0$
$t_1$   $\Delta^2_0$
  $\Delta^1_1$   $\Delta^3_0$
$t_2$   $\Delta^2_1$
  $\Delta^1_2$
$t_3$
etc.

The Gregory-Newton formula is as follows:

$$\Sigma t = r \left[ \frac{1}{2} t_0 + t_1 + t_2 \ldots \frac{1}{2} t_n - \frac{1}{12}\left(\Delta^1_{n-1} - \Delta^1_0\right) - \frac{1}{24}\left(\Delta^2_{n-2} + \Delta^2_0\right) - \frac{19}{720}\left(\Delta^3_{n-3} - \Delta^3_0\right) - \frac{3}{160}\left(\Delta^4_{n-4} + \Delta^4_0\right) - \frac{863}{60480}\left(\Delta^5_{n-5} - \Delta^5_0\right) - \frac{275}{24192}\left(\Delta^6_{n-6} + \Delta^6_0 \ldots\right) \right]$$

It has been found in practice that only the first three delta values, that is $\Delta^1$ $\Delta^2$ $\Delta^3$ are needed to retain the necessary accuracy of the data, and $\Delta^4$ etc. are therefore dropped from further consideration.

It will be noted in the following tabulation that the parts of the above formula are so arranged that the sums are found by adding across a single line.

| Angle $r$ | $\frac{1}{2}\tan\frac{a-b}{2}$ | $\Sigma$ | $-\frac{1}{12}(\Delta^1_{n-1}-\Delta^1_0)$ | $-\frac{1}{24}(\Delta^2_{n-2}+\Delta^2_0)$ | $-\frac{19}{720}(\Delta^3_{n-3}-\Delta^3_0)$ | $\Sigma$ | $\frac{0.1\Sigma}{2.303}$ | $R_a$ |
|---|---|---|---|---|---|---|---|---|
| 0.5 | 0.12081 | | | | | 0.00000 | 0.00000 | 1.000 |
| 0.6 | 0.12081 0.14023 | 0.12081 0.26104 | | | | 0.26104 | 0.01133 | 1.026 |
| 0.7 | 0.14023 0.16246 | 0.40127 0.56373 | −0.00044 | | | 0.56329 | 0.02446 | 1.050 |
| 0.8 | 0.16246 0.18561 | 0.72619 0.91180 | −0.00062 | −0.00031 | | 0.91087 | 0.03955 | 1.095 |
| 0.9 | 0.18561 0.21001 | 1.09741 1.30742 | −0.00083 | −0.00034 | −0.00012 | 1.30613 | 0.05671 | 1.140 |
| 0.2 | 0.77835 | 10.24570 | −0.01624 | −0.00224 | −0.00020 | 10.22704 | 0.44407 | 2.780 |
| etc. | | | | | | | | |

The summation (7th column) is multiplied by the angular spacing 0.1 radian, and converted into logs to the base 10 by dividing by 2.303. The corresponding anti logs are the radii of the reflecting surface. Unity (1) being the distance between the surface and the plane of the source along the axis. This therefore is the step which gives us the distance of each element in the reflector surface from the source.

*11 and 12. Graphical check on projection of light*

The next step in the optical design is to carefully plot the surface to as large a scale as possible and trace all the rays that have been computed. It has been found that a ray may be thus traced with a probable accuracy of less than a degree. This accuracy has been arrived at by repeated checks on a single ray and by noting the deviation of the plotted points from a smooth curve. The Figure 10 shows the results of one such graphical check, which in this case insures against any large systematic error in the design, but of course is not a check on design errors of less than a degree. The data for the rays within the collecting angles of 0 to 80° is represented by the dotted line and the data for the rays within the angles of 80 degrees to 113 degrees is represented by the heavy full line.

*13. Reduction to proper physical dimensions*

The diameter of the reflector is to be 14.25" at the predetermined value of 2 radians. The calculated radius vector $R_a$ at 2.0 radians ("$a$" degrees) was 2.780
the reflector radius $$Y = MR_a \sin(180-a)$$

or $$M = \frac{Y}{R_a \sin(180-a)}$$

where M is the multiplier to reduce all radii to correct value
Y is the outside reflector radius
$R_a$ is computed radius from focal point
"$a$" is angle of $R_a$ with axis $$M = \frac{7.125}{2.780 \times 0.90036} = 2.8184$$

*14. Rectangular coordinates for reflector*

Using the values of $R_a$ obtained above, the rectangular coordinates are computed. These final figures are listed below and are the dimensions used for making a templet for the reflector surfaces.

| Angle radians | Degree | $R_a$ | $MR_a$ | $MR_a \cos a$ | $MR_a \sin a$ |
|---|---|---|---|---|---|
| 0.5 | 28.65 | 1.0 | 2.818 | −2.473 | 1.351 |
| 1.0 | 57.30 | 1.191 | 3.357 | −1.813 | 2.825 |
| 1.5 | 85.94 | 1.607 | 4.629 | −0.321 | 4.518 |
| 2.0 | 114.59 | 2.780 | 7.835 | +3.259 | 7.125 |
| 2.1 | 120.32 | 3.282 | 9.250 | +4.669 | 7.986 |

What I claim as new and desire to secure by Letters Patent of the United States, is:

A reflector having its surface increments oriented by the following integration:

$$\int_0^b I_b(1-\cos b)db = K \int_0^a I_a(1-\cos a)da$$

wherein
  $b$ = angle of a ray in beam, measured from the axis
  $I_b$ = intensity in candles at angle $b$ from the axis at the vertex
  $a$ = angle of emitted ray measured from the axis at the focus
  $I_a$ = intensity at angle $a$
  K = coefficient of reflection of mirror.

FRANK A. BENFORD.